United States Patent
Minors

[11] 3,896,286
[45] July 22, 1975

[54] ELECTRIC WELDING APPARATUS

[76] Inventor: Christopher John Minors, 9 Southbourne Rd., Sheffield S10 2QN, England

[22] Filed: Sept. 25, 1973

[21] Appl. No.: 400,537

[30] Foreign Application Priority Data
Sept. 26, 1972 United Kingdom............... 44320/72
Sept. 26, 1972 United Kingdom............... 44321/72

[52] U.S. Cl.................................... 219/86; 219/78
[51] Int. Cl............................................. B23k 11/10
[58] Field of Search............................... 219/78, 86

[56] References Cited
UNITED STATES PATENTS

| | | | |
|---|---|---|---|
| 2,009,647 | 7/1935 | Brusse et al. | 219/86 |
| 2,130,657 | 9/1938 | Watkin | 219/86 |
| 2,464,839 | 3/1949 | Fairfield | 219/78 |
| 2,797,303 | 6/1957 | Kershaw | 219/78 X |
| 2,969,453 | 1/1961 | Page | 219/86 |
| 3,303,316 | 2/1967 | Bogosian | 219/78 X |
| 3,313,909 | 4/1967 | Matthews | 219/86 |
| 3,334,211 | 8/1967 | Wheeler et al. | 219/78 |
| 3,400,242 | 9/1968 | Waller | 219/86 X |
| 3,452,177 | 6/1969 | Davis et al. | 219/78 |
| 3,538,293 | 11/1970 | Procacino | 219/86 |
| 3,676,636 | 7/1972 | Anderson | 219/86 X |

Primary Examiner—J. V. Truhe
Assistant Examiner—N. D. Herkamp
Attorney, Agent, or Firm—Wolf, Greenfield, & Sacks

[57] ABSTRACT

An orthodontic electric welding machine in which an electrode turret has several electrodes any one of which can be placed in the operative position by turning of the turret. There is a second electrode and welding is carried out with the orthodontic component held under spring pressure between the electrodes. The electrodes are movable apart in a controlled, guided manner against the spring action. The power supply to the electrodes preferably is a pulsed supply the amplitude and width of such pulses being variable to vary the power supply.

9 Claims, 6 Drawing Figures

PATENTED JUL 22 1975  3,896,286

SHEET 1

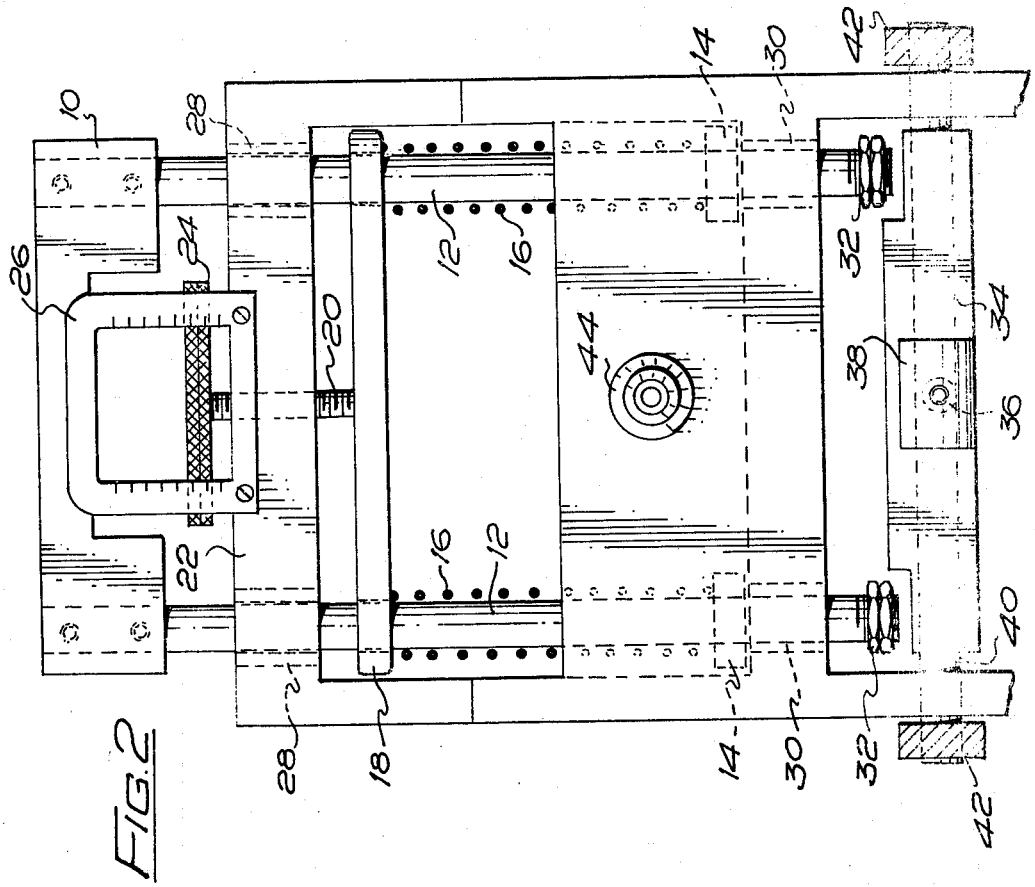

3,896,286

ELECTRIC WELDING APPARATUS

FIELD OF THE INVENTION

This invention relates to an orthodontic welding machine.

DISCUSSION OF PRIOR ART

Orthodontic components and appliances, which may be fixed or movable are all without exception small and somewhat delicate objects and frequently components thereof require to be welded. Heretofore there has been no satisfactory welding apparatus for this operation, and generally the quality of the welding and indeed the orthodontic appliance has depended upon the skill and dexterity of the orthodontic mechanic. The most relevant prior art known therefore is a manual welding operation.

OBJECTIVES OF THE INVENTION

An object of the present invention is to provide a cheap, but effective orthodontic welding machine which will facilitate the welding of orthodontic components.

A further object of the invention is to provide an orthodontic welding machine wherein the welding potential can be varied easily.

A still further object of the invention is to provide an orthodontic welding machine wherein electrodes can easily be changed.

A still further object of the invention is to provide an orthodontic welding machine wherein the pressure between the welding electrodes can be adjusted.

BRIEF DESCRIPTION OF THE INVENTION

According to the invention, the orthodontic welding machine includes two electrodes between which the orthodontic component to be welded is held, and one of said electrodes is capable of movement towards and away from the other electrode, said machine including spring means serving to apply the pressure between the electrodes when they hold an orthodontic component therebetween, said spring means being capable of having its tension adjusted so as to vary the pressure between the electrodes.

Said one electrode is carried by twin pillars which can be moved against the action of individual compression springs respectively acting on said pillars to resist movement of the said electrode away from the other electrode.

There is also means for adjusting the spring tension, such means comprising a screw adjusting device which acts through a compensating bar on the two springs.

The displacement of the electrode or its mounting is under the action of one or other of twin operating levers which control the movement of the pillars through a single control lever and a compensating lever.

The electric orthodontic welding machine according to the invention a rotatable electrode assembly including a plurality of electrodes any one of which can be used as one electrode of the electrode pair of the machine by indexing the assembly so that the electrode takes up the welding position, and further includes releasable locking means which automatically locks the rotatable turret when any electrode is moved to said position and ensures that the electrode is positioned in the optimum position for the welding operation.

The said locking means includes at least one spring loaded pin having a tapered end which engages in a correspondingly tapered hole in the rotatable assembly, and release of the locking means is obtained by depression of a button against the spring action to move the pin out of the hole.

The electric welding machine is adapted so that the power supply to the welding electrodes is in the form of electric pulses, said apparatus including means for varying the power supply, which means when operated varies not only the amplitude of the pulses, but also the width or duration of the pulses. Amplitude and pulse width variation preferably take place simultaneously.

BRIEF DESCRIPTION OF THE DRAWINGS

FIG. 2 is a front elevational view of a portion of the invention;

Figure 1:
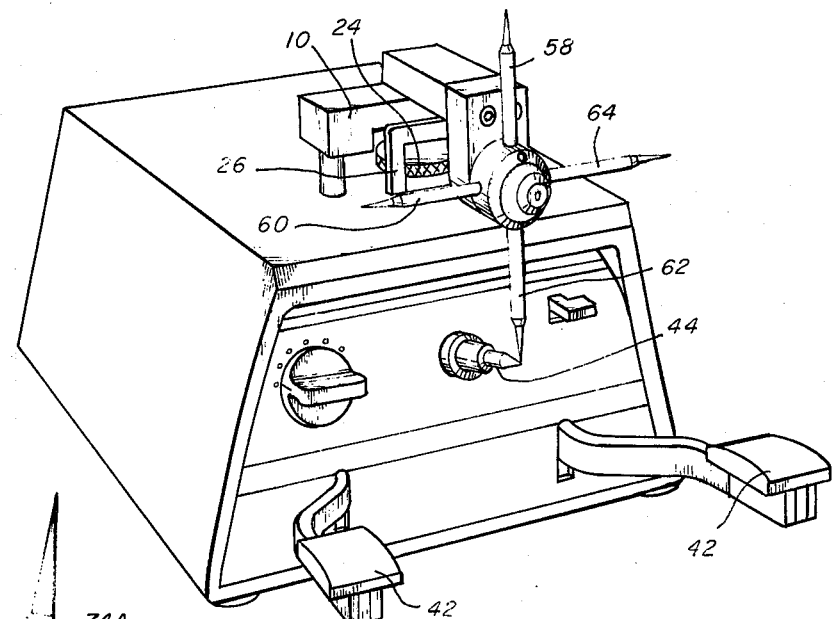
FIG. 1 is a perspective view of an orthodontic welding machine according to the invention.
Figure 6:
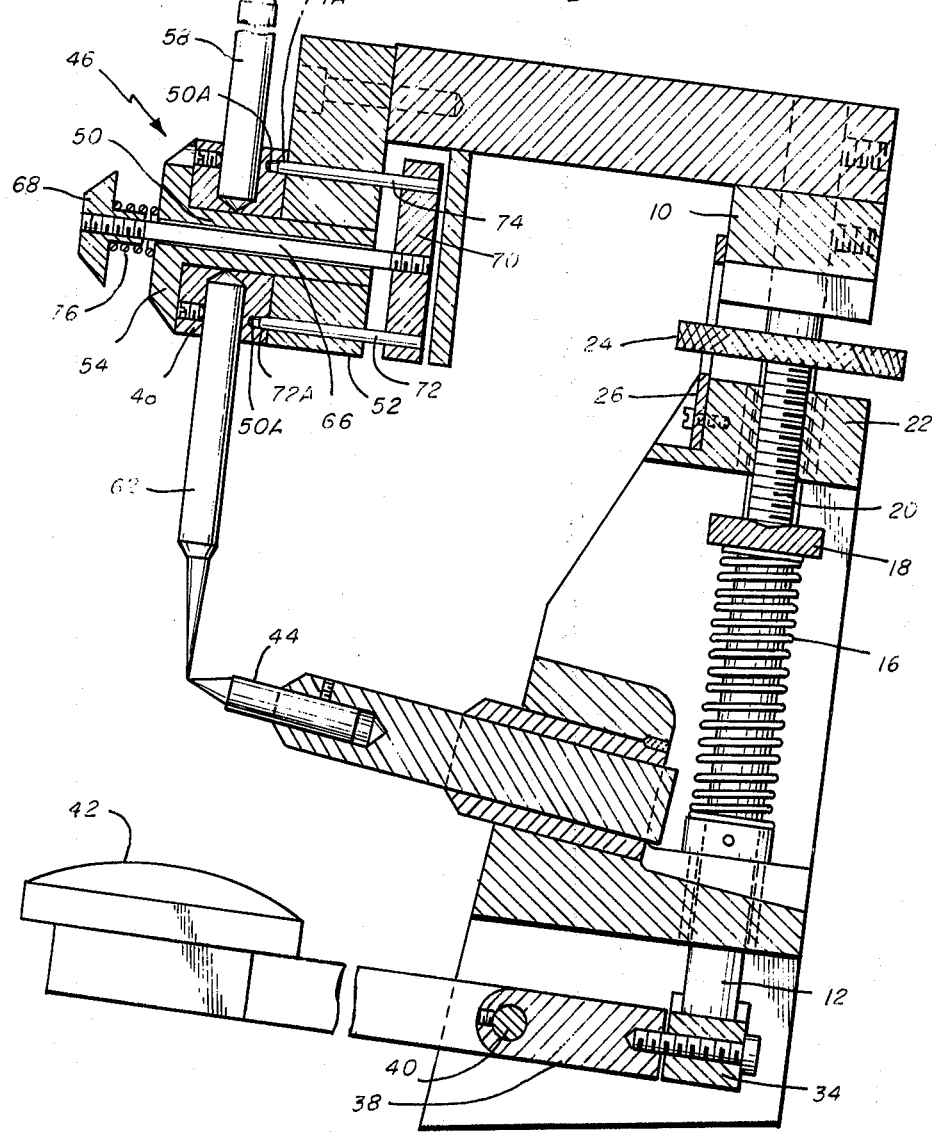
FIG. 6 is a section in side elevation showing the arrangement of electrodes in the invention.

In the drawings, there is shown in FIGS. 1 and 6 a mounting arrangement for the upper electrode of a two electrode orthodontic welding machine which operates on a principle of clamping the workpiece between the electrodes under spring pressure. The upper electrode arrangement is shown in detail in FIGS. 3 and 4. The upper electrode is connected to a bar 10 which is secured to twin pillars 12 which are parallel and spaced as shown in FIG. 2.

Referring now to FIGS. 1, 2, and 6 of the drawings, each of the pillars 12 is provided with a collar 14 and is surrounded by its own coil spring 16. These coil springs 16 bear against collars 14 and also against a compensating bar 18 which in turn bears at its central region on a tension adjusting screw 20. It is noted that the screw 20 is pointed and this engages in a similarly shaped recess in lever 18. The screw 20 is threaded in the machine frame 22 and is provided with a knurled handwheel 24 which forms a control wheel insofar as it co-operates with a scale bracket 26 suitably graduated to indicate the position of the wheel 24 and in effect the tension in springs 16. Bracket 26 is screwed to frame 22 as shown.

The pillars 12 are slidable in upper bearings 28 and lower bearings 30.

At the lower end, each pillar 12 is adapted to bear on a ledge of a compensating lever 34 which is mounted for pivotal movement about axle 40. The lever 34 is connected to a control lever 38 (see FIGS. 2 and 6) which is mounted for pivotal movement about axle 40. At the respective ends of axle 40 there are twin operator levers 42 under the control of the operator for displacing the upper electrodes as described hereinafter.

The frame 22 further supports the lower electrode 44.

In use of the apparatus thus far described, the pressure of springs 16 is applied through collars 14 to pillars 12 and hence to the upper electrode which presses the component or components between the upper and lower electrodes for the welding position. When it is desired to release the pressure on the component it is simply a matter of depressing either of levers 42 which causes pivotal movement of control lever 38 in the anticlockwise direction as viewed in FIG. 6, thereby raising the pillars 12. It is noted here that the compensating bar 34 acts to equalise the forces on the pillars 12 and that the raising of the pillars 12 is against further compression of springs 16.

When another component or components is or are placed between the electrodes and the pillars allowed once again to return to the clamping position under the action of spring 16 then the component or components to be welded is or are firmly clamped between the electrodes. The clamping pressure can be adjusted by rotation of handwheel 24 either to relieve the pressure for light welding or to increase the pressure to heavier welding.

This arrangement described provides an extremely suitable and efficient method of adjustment of the pressure between the electrodes and also for the moving apart of the electrodes to release the welded component or components. Moreover, the use of twin pillars ensures the movement of the upper electrode in the desired path without rocking and the use of compensating bar 18 and lever 34 ensures equal application of force on the respective pillars.

Figure 3:
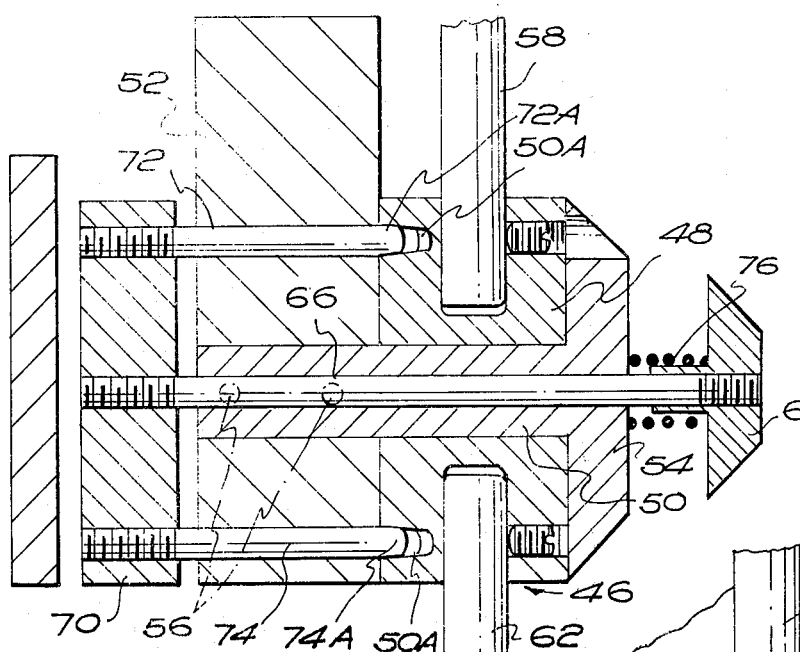
FIG. 3 is a sectional view showing the arrangement for positively locking the turret in position.
Figure 4:
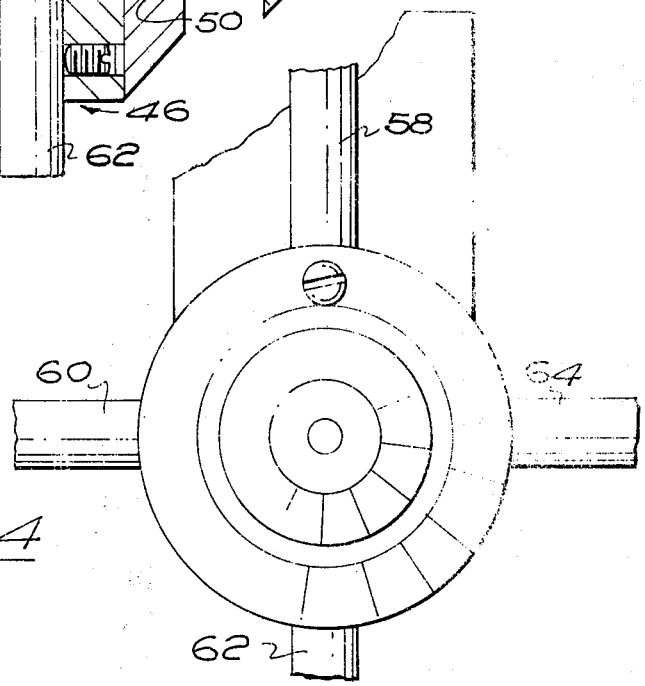
FIG. 4 is a front elevation of the apparatus shown in FIG. 3.

Referring now to the FIGS. 3 and 4, the two figures show the upper electrode of the electric orthodontic welding machine which is mounted on bar 10, and therefore the upper electrode is capable of up and down movement to clamp and release the components being welded.

The upper electrode in fact comprises a rotatable electrode assembly 46 comprised of a rotatable metallic bush 48 which can be rotated on a sleeve 50. The bush 48 is located between a mounting bracket 52 of the machine and a collar 54 integral with the sleeve 50. The sleeve 50 is locked to the mounting bracket by means of grub screws 56.

The bush 48 is in fact provided with a plurality of individual radially disposed electrodes (in this case 4) 58, 60, 62 and 64, any one of which can serve as the upper electrode in the welding operation. In the position illustrated in the drawings, the electrode 62 is adapted to co-operate with the lower electrode during the welding operation.

A rod 66 passes slidably through the sleeve 50 and at one end is provided with a release button 68 and at the other end with a mounting pad 70 which carries at diametrically spaced locations in relation to the sleeve 50, two locking and registration pins 72 and 74. These locking pins 72 and 74 are slidably located in suitable bores in the mounting bracket 52 and free ends of the pins 72 and 74 are tapered as at 72A and 74A. The bush 48 is provided with four tapered holes 50A which are located at registered positions in relation to the electrodes 58 – 64 and the tapered ends 72A and 74A of pins 72, 74 engage a pair of these holes 50A when each electrode such as electrode 62 is positioned for the welding operation.

A coil spring 76 acts between the button 68 and the collar to urge the mounting pad 70 and the pins 72, 74 to the position shown in FIG. 6 in which the tapered ends 72A and 74A engage a pair of the said holes 50A thereby locking the electrode assembly 46 in the exact position holding the electrode 62 in exact register with the lower electrode.

If it is desired to change electrode in the upper electrode assembly, e.g. if it is desired to use electrode 64 as opposed to 62, it is simply a matter of depressing button 68 against spring 76 which releases the ends 72A and 74A from the holes 50A and the turret 16 can be indexed round until the electrode 64 is approximately in the desired position. Release of button 68 results in tapered ends 72A and 74A engaging the appropriate holes 50A and positioning exactly the electrode 64.

Changing of electrodes in the upper electrode assembly is therefore extremely simple and the locking means comprising the pins 72 and 74 operates automatically upon release of the button 68 resulting in a rigid, accurate holding of the electrode assembly 46.

FIG. 1 shows the general construction of the welding machine. The electrode assembly is shown as having four electrodes but it will be appreciated that this number may be varied from two to any maximum number which physical considerations will allow.

Alternative constructions for the rotatable electrode assembly are possible within the scope of this aspect of the invention. For example, the upper electrode may be fixed whilst the lower electrode assembly is a rotatable turret, and/or both upper and lower electrodes may be embodied in rotatable turret assemblies.

Figure 5:
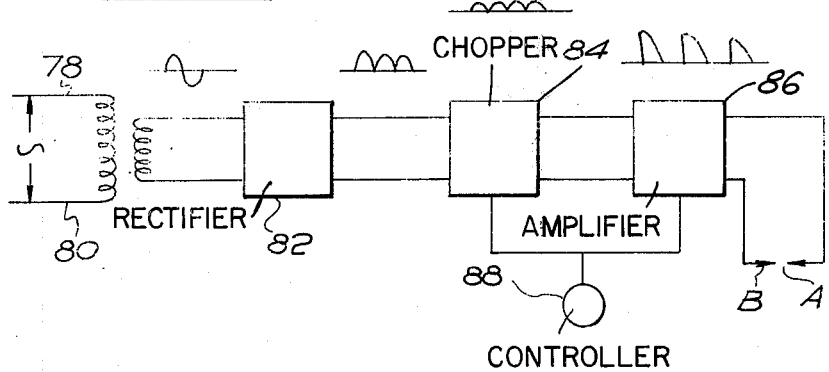
FIG. 5 is a circuit diagram illustrating the basic electrical circuitry of the machine.

Referring now to FIG. 5, in this Figure there is shown a circuit diagram of the electrical power supply circuit for the electric welding machine described. The two electrodes across which the power is applied are indicated at A and B. The circuit is adapted to supply power to the electrodes A and B in pulses.

The pulses are derived by rectifying mains a.c. current supplied at terminals 78, 80, and chopping each half wave appropriately. The rectifying circuit is illustrated at 82 whilst the chopping circuit is indicated at 84. The a.c. supply may be half wave or full wave rectified as desired. An amplifier 86 is included in the circuit so that the pulse amplitude can be varied.

The means 88 controlling the amplitude and width of the pulses is preferably such as to give increased pulse width with increased pulse amplitude. In such case, on a low power setting, short duration low amplitude pulses supply the power, whereas on a high power setting, long high amplitude pulses supply the power.

There may be two separate internal control circuits for amplitude and width of pulse, and the two circuits may be under the control of a single ganged rotary switch 88 under the control of the operator. In another arrangement, a set of buttons may be provided, each button when pressed setting the control circuits to give, simultaneously, a particular pulse amplitude and width of pulse.

The individual stages of the power supply circuit and control circuit may be of conventional construction in themselves. However, the novelty for this application resides in the particular combination used in the orthodontic welder.

As the power supplied to the electrode is dependent upon the area defined by each pulse, then by the present invention, which arranges pulse width and amplitude variation in a single operation, quick supplied power adjustment is possible making the apparatus much more flexible in use.

I claim:

1. An orthodontic welding machine comprising
   1. a first electrode, 2. a turret support,
3. a turret rotatably mounted on the turret support,
4. a plurality of second electrodes radiating from the turret and disposed to permit any one of the second electrodes to be selectively brought into welding registration with the first electrode,
5. a push button located centrally of the rotatable turret,
6. locking and registration pin means connected to the push button,
7. turret locking spring means acting upon the locking and registration pin means and urging the locking and registration pin means into locking apertures in the turret support, whereby release of the turret is effected by pressing the push button against the action of the turret locking spring means to disengage the locking and registration pin means from the locking apertures, the turret and the second electrodes thereupon being enabled to rotate on the turret support to permit a selected second electrode to be brought into welding registration with the first electrode and whereby release of the push button causes reengagement of the locking and registration pin means in the locking apertures to retain the selected electrode in firm welding registration with the first electrode,
8. two spaced parallel pillars,
9. carrier means movably mounted on the pillars, the carrier means having the turret support mounted thereon,
10. welding spring means acting on the carrier means to urge the first electrode and turret together,
11. displacement means for moving the turret and first electrode apart against the action of the welding spring means, and
12. electrical power supply means for supplying electrical power to the first electrode and the second electrode which is locked in registration therewith to effect welding.

2. The orthodontic welding machine according to claim 1, wherein the welding spring means comprises individual compression springs on the pillars.

3. The orthodontic welding machine according to claim 2, wherein the machine further includes a screw adjusting device which acts through a compensating bar on the two springs for simultaneously adjusting the tension in the welding spring means.

4. The orthodontic welding machine according to claim 1, wherein the displacement means comprises an operating lever means located to act on the pillars through a single control lever and compensating lever.

5. The orthodontic welding machine according to claim 1, wherein said locking and registration pin means includes at least one pin having a tapered end which engages a correspondingly tapered hole in the turret support.

6. The orthodontic welding machine according to claim 1, wherein the electrical power supply means supplies power to the welding electrodes in the form of electric pulses, said machine further including control means varying the power, which means when operated simultaneously varies the amplitude and width of the pulses.

7. The orthodontic welding machine according to claim 6, wherein the control means controlling the amplitude and width of the pulses is such as to give increased pulse width with increased pulse amplitude.

8. The orthodontic welding machine according to claim 7, wherein said control means include two separate internal control circuits for amplitude and width of pulse, and the two control circuits are adjustable by operation of a single ganged rotary switch.

9. The orthodontic welding machine according to claim 7, wherein said control means includes two separate internal control circuits for amplitude and width of pulse, and the two control circuits are adjustably by operation of any of a set of buttons, each button when pressed setting the control circuits to give a particular pulse amplitude and width.

* * * * *